United States Patent
Saito et al.

(10) Patent No.: US 6,330,703 B1
(45) Date of Patent: Dec. 11, 2001

(54) METHOD AND CIRCUIT FOR DETERMINING THE POWER CONSUMPTION REQUIREMENTS FOR A SEMICONDUCTOR LOGIC CIRCUIT AND DESIGNING THE CIRCUIT ACCORDINGLY

(75) Inventors: Tatsuya Saito, Hachiouji; Masayoshi Yagyu, Hannou; Hiroki Yamashita, Hachiouji; Tsuneyo Chiba, Kanagawa; Masakazu Yamamoto, Hadano, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/041,121

(22) Filed: Mar. 12, 1998

(30) Foreign Application Priority Data

Mar. 13, 1997 (JP) .................................................. 9-058793

(51) Int. Cl.[7] .......................... G06F 17/50; G06F 19/00; G06F 1/32; G01R 21/00
(52) U.S. Cl. .................................... 716/4; 716/8; 703/18; 703/16; 702/60; 702/120; 714/30; 713/340
(58) Field of Search ........................ 395/500.02–500.19, 395/500.36, 500.37, 500.39, 183.09, 183.08, 183.13, 183.06, 183.14, 750.01–750.09; 702/60, 120, 124, 65, 182, 109, 121, 108; 364/468.01, 468.02, 468.03, 468.28, 468.15, 468.16; 700/109, 108, 121, 90–99; 714/30–39; 703/13–18; 716/1–21; 713/100, 300–340

(56) References Cited

U.S. PATENT DOCUMENTS 5,625,803 * 4/1997 McNelly et al. ..................... 703/14
5,668,732 * 9/1997 Khouja et al. ....................... 702/60
5,682,320 * 10/1997 Khouja et al. ....................... 716/4
5,740,407 * 4/1998 Yeap et al. .......................... 703/13
5,754,436 * 5/1998 Walsh et al. ........................ 713/300
5,835,380 * 11/1998 Roethig .................................. 716/2
5,838,947 * 11/1998 Sarin .................................... 703/14
5,847,966 * 12/1998 Uchino et al. ........................ 716/2
5,949,689 * 9/1999 Olson et al. ......................... 703/14

FOREIGN PATENT DOCUMENTS 5-265605  10/1993 (JP) ................................ G06F/1/28

OTHER PUBLICATIONS

OnOzawa et al. ("Post–layout optimization of power and timing for ECL LSIs", Proceedings of the European Design and Test Conference, Mar. 6, 1995, pp. 167–172).*

(List continued on next page.)

Primary Examiner—Matthew Smith
Assistant Examiner—Phallaka Kik
(74) Attorney, Agent, or Firm—Mattingly, Stanger & Malur, P.C.

(57) ABSTRACT

A logic circuit determines the power consumption of a semiconductor integrated device by taking into consideration the variation of the rate of operation. A control signal (TEST) is applied to each control signal input port (Tin) of flip-flop circuits of flip-flop circuit groups and a logic gate circuit having a plurality of input ports A and B in a combined circuit group. If the control signal (TEST) is low, both the flip-flop circuits and the logic gate circuit operate normally. However, if the control signal (TEST) is high, each of them performs the power consumption test. Regardless of the value of input signals applied to input ports D1 and D2 of the flip-flop circuits, the flip-flop circuits are controlled to have a repetitive output signal of high and low levels at ports Q1 and Q2, in synchronism with a clock signal. Through this operation test, operational failure is reduced and the quality of semiconductor chip production is guaranteed, because it is possible to predict accurately the power consumption when designing the logic circuit due to the relationship between the rate of operation and the power consumption.

10 Claims, 12 Drawing Sheets

OTHER PUBLICATIONS

Pant et al. ("Device–circuit optimization for minimal energy and power consumption in CMOS random logic networks", Proceedings of 1997 Design Automation Conference, 34th DAC, pp. 403–408, Jan. 1, 1997).*

Monteiro et al. ("Optimization of combinational and sequential logic circuits for low power using precomputation", Sixteenth Conference on Advanced Research in VLSI, 1995, Mar. 27, 1995, pp. 430–444).*

Parameswaran et al. ("Power consumption in CMOS combinational logic blocks at high frequencies", Proceedings of the ASP–DAC '97 Asia and South Pacific Design Automation Conference, pp. 195–200, Jan. 28, 1997).*

Najm ("Estimating power dissipation in VLSI circuits", IEEE Circuits and Devices Magazine, vol. 10, No. 4, Jul. 1994, pp. 11–19).*

Monteiro et al. ("Techniques for the power estimation of sequential logic circuits under suer–specified input sequences and programs", Proceedings of 1995 International Symposium on Low Power Design, Apr. 23, 1995, pp. 33–38).*

* cited by examiner

EXAMPLE CIRCUIT

US 6,330,703 B1

METHOD AND CIRCUIT FOR DETERMINING THE POWER CONSUMPTION REQUIREMENTS FOR A SEMICONDUCTOR LOGIC CIRCUIT AND DESIGNING THE CIRCUIT ACCORDINGLY

BACKGROUND OF THE INVENTION

1. Field of the Invention

The present invention relates to a semiconductor logic circuit, for example, a microprocessor or a RAM having a plurality of flip-flops and logic gate circuits. More specifically, the present invention relates to controlling a logical operation, controlling the power consumption of the semiconductor logic circuit arbitrarily, measuring a value of power consumption, and calculating in advance the power consumption when designing the semiconductor logic circuit.

2. Description of the Related Art

In order to activate a semiconductor logic circuit, such as a microprocessor, power supply lines and signal lines of the semiconductor logic circuit are wired to a package, such as a programmable gate array (PGA), potting, mounting them on the printed circuit board, and connecting the printed circuit board to the power supply unit (such as an electric cell). In order for the logic circuit to operate normally, it is necessary to determine the number of wiring lines for the power supply, the width of each power supply wiring line, a value of the resistance, the inductance and the capacitance of wiring for the power supplied to both the package and the circuit board, and further to set a total amount of current supply from the power supply unit to an optimal value. To achieve this purpose, it is important to predict the power consumption accurately when activating the semiconductor logic circuit.

As indicated in Japanese patent No. 5-265605, for example, the method of employing a hand calculation or a logic simulator is used so as to predict the power consumption of the semiconductor logic circuit for designing.

FIG. 11 is a flow chart for designing a semiconductor logic circuit and producing a semiconductor chip according to the prior art. For designing the logic of the semiconductor circuit, logical design data 1103 having a circuit diagram of the semiconductor logic circuit shown in FIG. 12, for example, is generated by executing a logic design subroutine 1102 based upon a functional specification 1101, which defines function, operational frequency and allowable power consumption of the semiconductor logic circuit being designed. The power consumption data 1105, having a power consumption timing chart as shown in FIG. 13, is generated when each logic gate circuit consumes its power for switching its output, based upon the semiconductor device data 1104 used for the semiconductor logic circuit. An average data for the rate of operation 1107 for each logic gate circuit of the semiconductor logic circuit, which has a timing chart for the rate of operation as in FIG. 13, is generated based upon the analysis of the operation for several kinds of the predetermined programs 1106 executed in the semiconductor logic circuit. The confirmation of function 1108 and the power consumption calculation 1109 are executed by hand calculation or by a calculation program, based upon the logical design data 1103, the power consumption data 1105, and the average data for the rate of operation 1107. If the results at the steps 1108 and 1109 do not satisfy the function and the power consumption defined in the step of the functional specification 1101 (i.e., the result is NG1), the logical design data 1103 is corrected by feeding-back the results and re-executing the logic design subroutine 1102. This feedback routine repeats itself until the above results of steps 1108 and 1109 satisfy the function and the power consumption defined in the step 1101 (i.e., the result is OK1).

In designing the layout of the semiconductor circuit, the physical design data 1111 is produced by executing the layout design subroutine 1110, based upon the logical design data 1103. The test program 1112 used for an operation test of the semiconductor logic circuit is produced by pulling a representative operation program from several kinds of predetermined programs 1106 executed in the semiconductor logic circuit. The detailed functional test 1113 and the detailed calculation of the power consumption 1114 are executed by using the logical simulation program, based upon the physical design data 1111, the semiconductor device data 1104, and the test program data 1112. If the results at steps 1113 and 1114 do not satisfy the function and the power consumption defined in the step of the functional specification 1101 (i.e., the result is NG2), either the logical design data 1103 is corrected by feeding-back the results and re-executing the logic design subroutine 1102 or the physical design data 1111 is corrected by re-executing the layout design subroutine 1110. This feedback routine repeats itself until the results of steps 1113 and 1114 satisfy the function and the power consumption defined in step 1101 (i.e., the result is OK2).

The prototype semiconductor chip is produced according to the physical design data 1111 at step 1115. Both the functional operation test 1117 and the measurement of the power consumption 1118 are executed by running the test program 1112 on the semiconductor logic circuit 1116 produced at step 1115. If the results at the steps 1117 and 1118 do not satisfy the function and the power consumption defined in the functional specification 1101 (i.e., the result is NG3), either the chip is reproduced at step 1115 or the logical design data 1103 is corrected by feeding-back the results and re-executing the logic design subroutine 1102, or the physical design data 1111 is corrected by re-executing the layout design subroutine 1110. If the results at steps 1117 and 1118 satisfy the function and the power consumption defined in step 1101 (i.e., the result is OK3), the chip produced at step 1115 is determined as a good quality semiconductor logic circuit at step 1119.

SUMMARY OF THE INVENTION

The present invention overcomes the deficiencies in the prior art. The prior art flow chart of FIG. 11 is not sufficient to design a chip to handle power consumption when the rate of operation for the logic circuit varies extremely during a short period of time. This is because the semiconductor chip is designed by calculating the power consumption of the semiconductor logic circuit based upon an assumed average rate of operation obtained from the predetermined programs 1106.

If an actual program is executed in the semiconductor logic circuit, the rate of operation might vary frequently. Therefore, for the detailed calculation of the power consumption 1114 at the process of designing the layout and/or for the measurement of the power consumption 1118 at the process of producing a prototype semiconductor chip, the test program 1112 considering the variation is required to be used in the prior art flow chart of FIG. 11. However, the more complicated the semiconductor, the harder it is to produce test program 1112. It is impossible to generate test program 1112 assuming the most extreme condition that can occur and to execute the operation test 1117.

Because of these disadvantages of the prior art as shown in FIG. 11, when several kinds of programs are executed, an unpredictable variation for the rate of operation occurs. As a result, the semiconductor logic circuit cannot supply sufficient power from the power supply source, causing operational failure, even if the power consumption of the semiconductor logic circuit satisfies the functional specification for the operation test.

FIG. 13 is an example timing chart showing the extreme variation of power consumption that occurred, with respect to such unpredictable variation for the rate of operation if the combined circuit group is a dynamic circuit having the control signal applied. Further, the example circuit diagram of a general semiconductor logic circuit retrieved from the logical design data 1103 in the prior art flow chart of FIG. 11 to perform a logical operation and to result in the extreme variation of the power consumption as mentioned above is introduced in FIG. 12. The example circuit diagram includes flip-flop circuit groups 1201, 1202 and the combined circuit group 1203 having a plurality of logic gate circuits connected between the circuit groups 1201 and 1202. When a clock signal (CLOCK) is applied to the clock terminals (Ck) of the flip-flop circuits 1204 and 1205, each circuit 1204 and 1205 latches signals applied to the input ports D1 and D2, and the latched signals are outputted to the output ports Q1 and Q2. These output signals from the output ports Q1 and Q2 are transferred through the logical calculation at the logic gate circuits 1208, 1209 and 1210 into the input ports D3 and D4 of the flip-flop circuits 1206 and 1207.

By using sample data for the timing chart of FIG. 13, switching time (i.e., the rate of operation) of both flip-flop circuits 1204, 1205 and logic gate circuits 1208, 1209 and 1210 is varied largely with a pattern of signal applied to the input ports D1 and D2, and as a result, their power consumption varies similarly. Hence, because there are infinite patterns of data in real life, it is impossible to predict how the variation of the power consumption occurs based upon the combination of the logic circuits. In addition, it is impossible for the prior art flow chart as in FIG. 11 to produce a test program 1112 to apply a large variation of power consumption for the operation test 1117.

In view of these deficiencies in the prior art, a purpose of this invention is to solve the problem of the prior art by designing a semiconductor logic circuit considering the extreme variation for the rate of operation (i.e., the variation of power consumption) and calculating the power consumption of that semiconductor logic circuit. Another purpose of this invention is to achieve the operation test 1117 of the semiconductor logic circuit considering the extreme variation for the power consumption and providing the semiconductor logic circuit having the least operational failure.

In order to carry out the above mentioned purposes, it is an object of this invention to determine the configuration of a flip-flop circuit, a logic gate circuit and the rate of operation by using a control signal applied to each circuit, and to control the power consumption of each circuit to an arbitrary value for a semiconductor logic circuit. The semiconductor logic circuit includes a plurality of the flip-flop circuit groups having the logical information; a combined circuit group having a plurality of the logic gate circuits executing the logical calculation, being connected between the flip-flop circuit groups; and a clock circuit supplying clock signal to the flip-flop circuit group and the combined circuit group, respectively.

Another object of the present invention is to provide a power consumption control method for a semiconductor logic device including a flip-flop circuit group including pluralities of flip-flop circuits for processing logical information, a combined circuit group including pluralities of logic gate circuits executing logical calculation connected to said flip-flop circuit group, and a clock circuit supplying a clock signal to said flip-flop circuit group. The method encompasses setting configuration and rate of operation of the semiconductor logic device by applying a control signal executing an operation test of the semiconductor logic circuit to at least one of the flip-flop circuits and the logic gate circuits and determining the power consumption when operating the semiconductor circuit according to the configuration and the rate of operation.

Another object of the present invention is to provide a method for determining power consumption of a semiconductor logic device based upon logical simulation using logical or physical design data, the device including flip-flop circuit groups having pluralities of flip-flop circuits for processing logical information, a combined circuit group including pluralities of logic gate circuits executing logical calculation connected between the flip-flop circuit groups, and a clock circuit supplying a clock signal to the flip-flop circuit groups. The method encompasses replacing data corresponding to the flip-flop circuits and the logic gate circuits in the logical or physical design data with data corresponding to a circuit used for power consumption calculation and being capable of setting an arbitrary rate of operation and producing logical or physical design data used for power consumption calculation from the data as replaced and determining power consumption based upon the produced data.

Another object of the present invention is to provide a power consumption control circuit for the semiconductor logic device including a plurality of flip-flop circuits for processing logical information, a plurality of logic gate circuits executing logical calculation and being connected to the flip-flop circuits and a dummy circuit connected between the flip-flop circuits and the logic gate circuits to output a repetitive signal of high and low levels wherein configuration and rate of operation of the semiconductor logic device are set by applying a control signal executing an operation test of the semiconductor logic circuit to at least one of the flip-flop circuits and the logic gate circuits and wherein power consumption is determined when operating the semiconductor circuit according to the configuration and the rate of operation.

Another object of the present invention is to provide a method of manufacturing a semiconductor logic device including a flip-flop circuit group including pluralities of flip-flop circuits for processing logical information, a combined circuit group including pluralities of logic gate circuits executing logical calculation connected between the flip-flop circuit group, and a clock circuit supplying a clock signal to the flip-flop circuit group. The method encompasses setting configuration and rate of operation of the semiconductor logic device by applying a control signal executing an operation test of the semiconductor logic circuit to at least one of the flip-flop circuits and the logic gate circuits, determining the power consumption when operating the semiconductor circuit according to the configuration and the rate of operation and constructing the semiconductor logic device with power lines, power supply and other power handling taking into consideration the power consumption obtained from the step of determining.

Another object of the present invention is to provide a logical operation control method for a logic circuit including a plurality of logic gate circuits for processing logical calculations, a clock circuit supplying a clock signal to the logic gate circuits. The method encompasses setting a rate of operation for the logic gate circuits according to a control signal for executing an operation test of the logic gate circuits and operating the logic gate circuit based upon the rate of operation as set.

Still another object of the present invention is to provide a power consumption control method for a logic circuit including a plurality of logic gate circuits for processing logical calculations, a clock circuit supplying a clock signal to the logic gate circuits. The method encompasses setting a rate of operation for the logic gate circuits according to a control signal for an executing operation test of the logic gate circuits and determining power consumption when operating the logic gate circuits according to the rate of operation as set.

Still another object of this invention is to provide a semiconductor logic device including flip-flop circuit groups having a plurality of flip-flop circuits having logical information, at least one combined circuit group having a plurality of logic gate circuits for processing logical calculations and being connected between the flip-flop circuit groups, a clock circuit supplying a clock signal to the flip-flop circuit groups and an input terminal at an input side of the flip-flop circuits and the logic gate circuits to which a control signal is applied in order to execute an operation test of the circuits by setting a configuration and a rate of operation for the circuits.

To calculate the power consumption of the semiconductor logic circuit, this invention replaces the flip-flop circuit or the logic gate circuit from either logical or physical design data when simulating each circuit with a circuit used for the calculation of the power consumption capable of setting an arbitrary rate of operation, and to calculate the power consumption of both circuits, by a simulation program using the logical or physical design data when producing the semiconductor logic circuit.

Still another object of this invention is to employ a test logic circuit to determine the power consumption in at least one block of a plurality of similar blocks forming the semiconductor device. This test logic circuit can be implemented by computer simulation and may or may not be a permanent part of the final device.

These and other objects, features and advantages of the present invention will become more important in view of the following detailed description of the present invention.

BRIEF DESCRIPTION OF THE DRAWINGS

Embodiments of the present invention are described below in conjunction with the figures, in which.

DESCRIPTION OF THE PREFERRED EMBODIMENT

A description will be given of the present invention embodiments by reference to the accompanying drawings.

Figure 1:
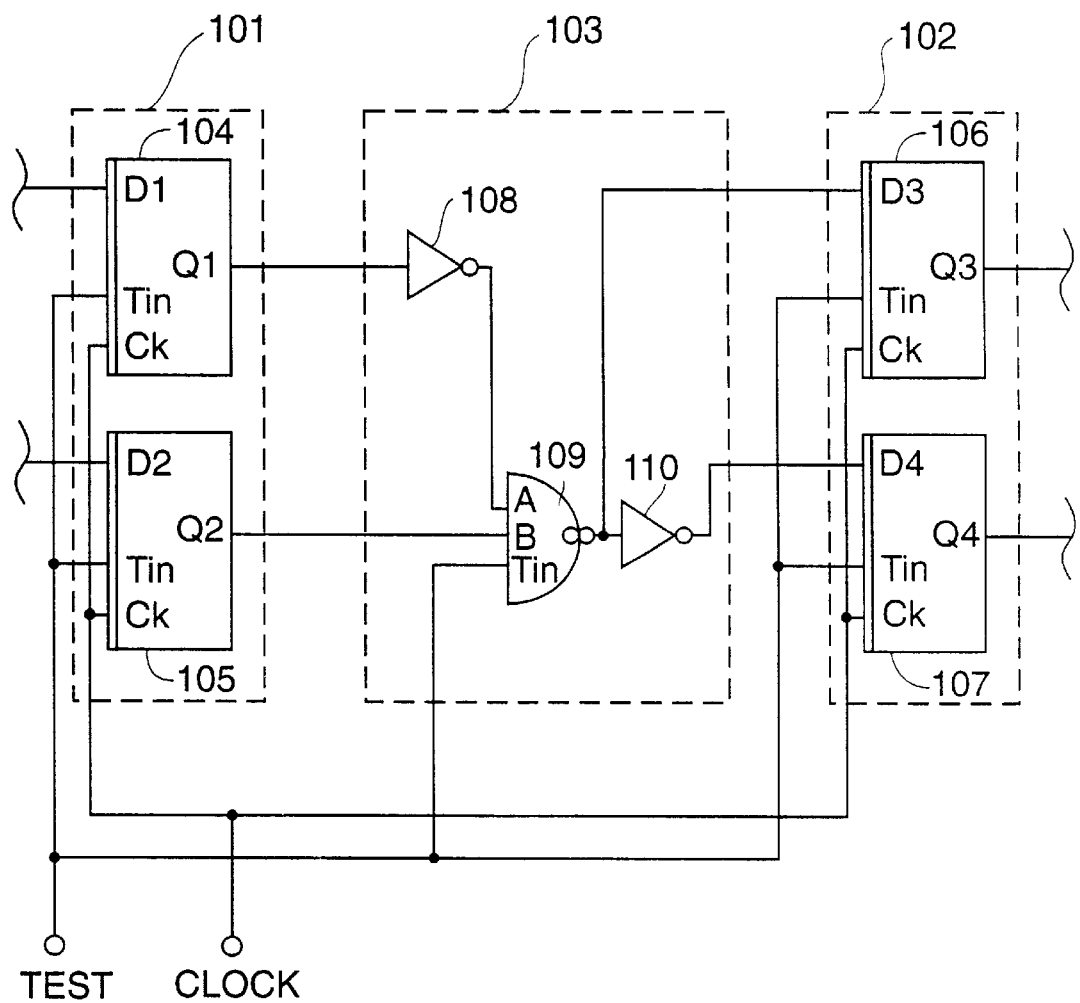
FIG. 1 is a basic circuit diagram of the semiconductor logic circuit based upon this invention.

FIG. 1 shows a basic circuit diagram for the semiconductor logic circuit of this invention, including the flip-flop circuit groups 101, 102 and the combined circuit group 103 having a plurality of logic gate circuits such as inverters and NAND gates, for example. This circuit is used to calculate power consumption of a block of a semiconductor device formed from a plurality of blocks. This logic circuit can be implemented by computer simulation. Furthermore, the circuit may or may not be a part of the final semiconductor device.

Each of the flip-flop circuits 104 through 107 of the flip-flop circuit groups 101, 102 and the logic gate circuit 109 (a two-input NAND gate) includes input port Tin. To control both input signals A and B of gate circuit 109, the control signal (TEST) is applied to input ports Tin.

Figure 2:
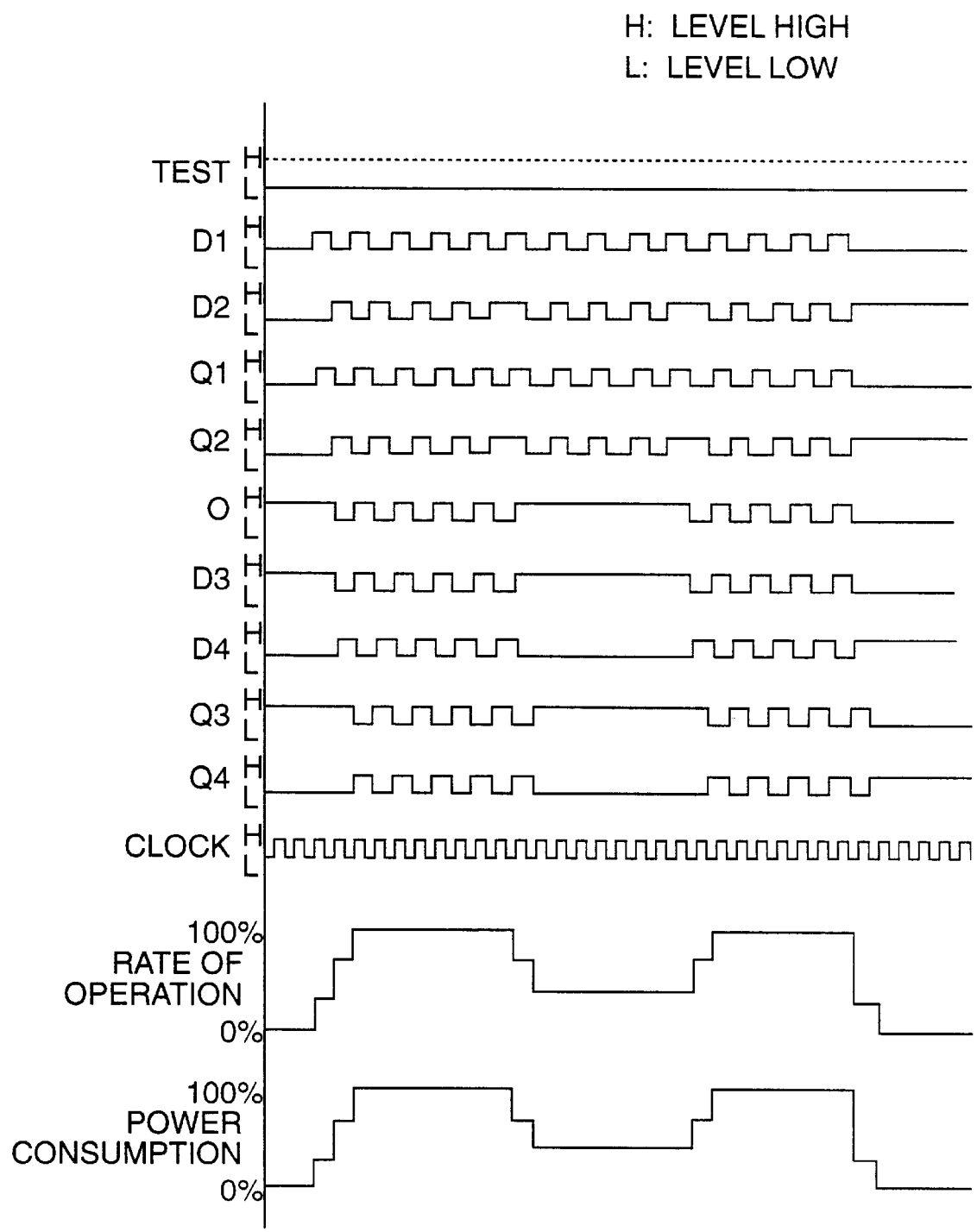
FIG. 2 is a timing chart showing the operation of the semiconductor logic circuit in FIG. 1, and further showing the rate of operation and the power consumption of the semiconductor circuit.
Figure 12:
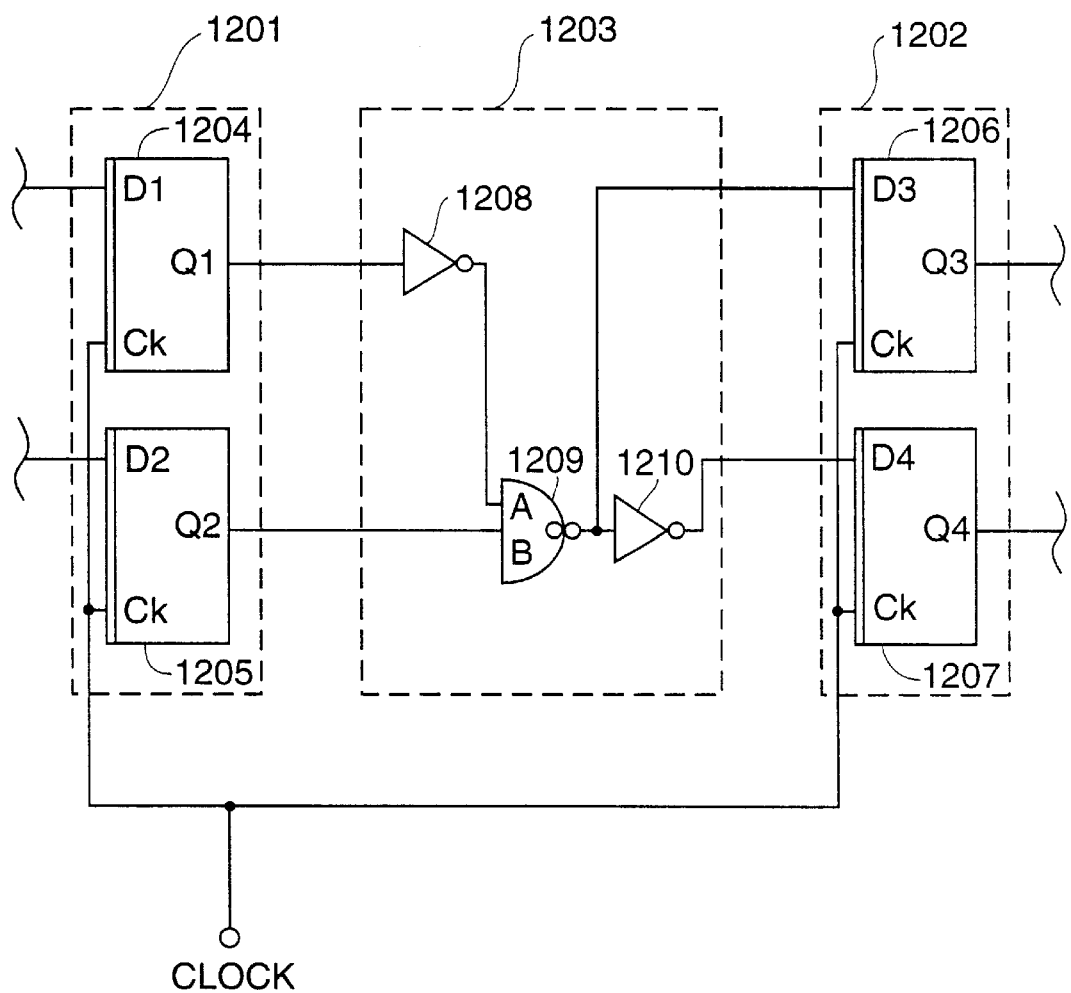
FIG. 12 is an example circuit diagram of a general semiconductor logic circuit.
Figure 13:
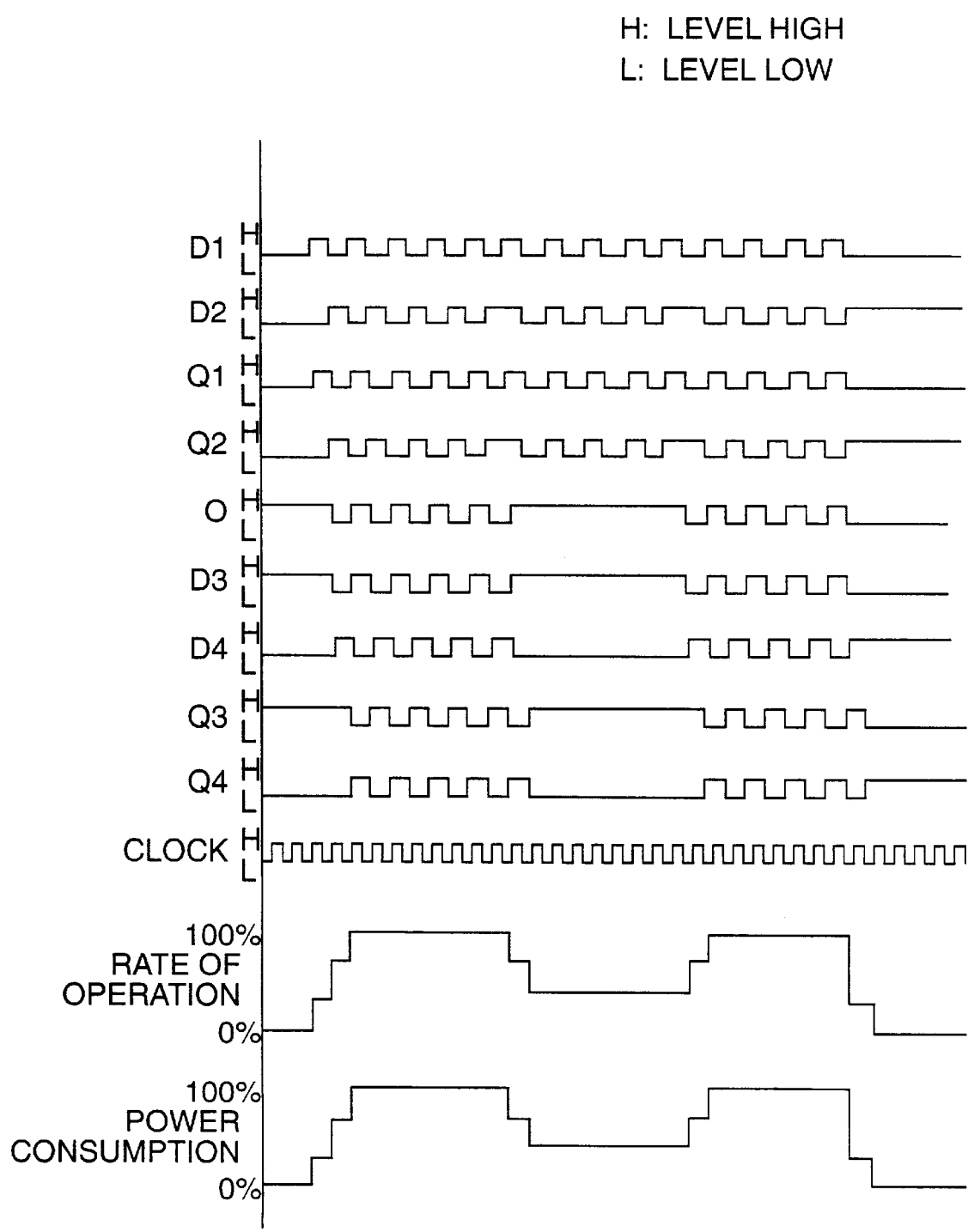
FIG. 13 is a timing chart useful in analyzing the operation, the rate of operation and the power consumption of the example circuit of FIG. 12.

When the control signal (TEST) is low as in FIG. 2, the semiconductor logic circuit of FIG. 1 operates as well as the example circuit does in FIG. 12. For example, if the clock signal (CLOCK) is applied to each clock terminal (Ck) of the flip-flop circuits 104 and 105, each of the circuits 104 and 105 latches the signals applied to the input ports D1, D2 and outputs them to the output ports Q1, Q2. These output signals from the output ports Q1, Q2 are transferred through the logical calculation at the logic gate circuits 108, 109, 110 into the input ports D3, D4 of the flip-flop circuits 106 and 107.

Figure 3:
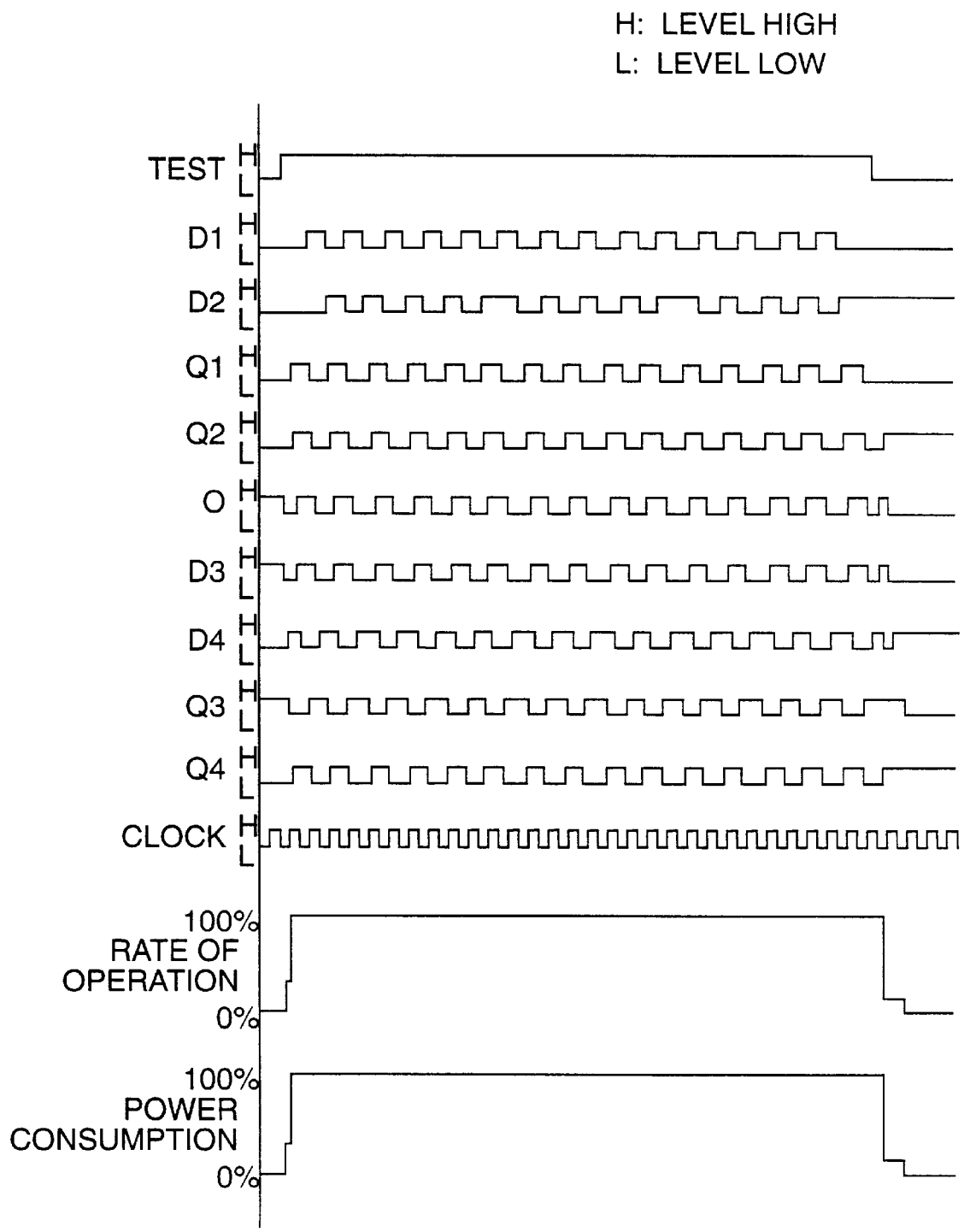
FIG. 3 is a timing chart showing the operation of the power consumption test for the semiconductor logic circuit in FIG. 1, and further showing the rate of operation and the power consumption for the semiconductor circuit.

When the control signal (TEST) is high as in FIG. 3, the power consumption test is executed. Then, the output ports Q1 and Q2 of the flip-flop circuits 104 and 105 output the signals of high and low levels repetitively regardless of the signals applied to the input ports D1 and D2. Although the output signals from the ports Q1 and Q2 are transferred to each of the logic gates 108, 109, 110 of the combined circuit 103, the logic gate 109 to which the control signal (TEST) is applied does not execute the logical calculation and its output port (O) outputs the signal of high and low levels repetitively according to port A of the logic gate to which the input signal is applied. The logic gates 108 and 110 do not need to receive the control signal (TEST) because each of them outputs the signal of high and low levels repetitively based upon the input signals from the output ports Q1 and Q2.

In other words, when the control signal (TEST) is low as in FIG. 2, the variation for the rate of operation (i.e., the variation of the power consumption) for both the flip-flop circuits 104, 105 and the logic gate circuits 108, 109, 110 depends upon the pattern of signals applied to the input ports D1, D2.

On the other hand, when the control signal (TEST) is high as in FIG. 3, the rate of operation for both circuits 101, 103 has a maximum value regardless of the pattern of signals applied at D1, D2 because both the flip-flop circuits 104, 105 and the logic gate circuits 108, 109, 110 always output the signals of high and low levels repetitively. The rate of operation of circuits 101 and 103 determines the power consumption of those circuits. The invention, therefore, sets the power consumption of the above mentioned circuits to a maximum value for a set of the flip-flop circuit groups and the combined circuit group when the control signal (TEST) is high.

According to a principle of this invention, the power consumption of the whole semiconductor logic circuit as in FIG. 1 is arbitrarily controlled by dividing the corresponding whole semiconductor logic circuit into a plurality of circuit blocks and by setting the rate of operation for a block to which the control signal for the block is applied, to a maximum value. For example, the power consumption for the whole semiconductor logic circuit can be set arbitrarily for approximately 10% pitch between 0 and 100%, based upon the operation of the control signal, by dividing the whole semiconductor logic circuit into 10 blocks, each block having the same number of circuits and by applying the control signal to an individual block.

This invention reduces operational failure and guarantees quality, because when measuring the power consumption for the process to produce the chip of the semiconductor logic circuit, the rate of operation can be set to a desired value regardless of the test program and the extreme variation for the rate of operation can also be set arbitrarily.

The following examples of flip-flop circuits and logic gate circuits based upon this invention, are capable of controlling the rate of operation by applying the control signal.

Figure 4:
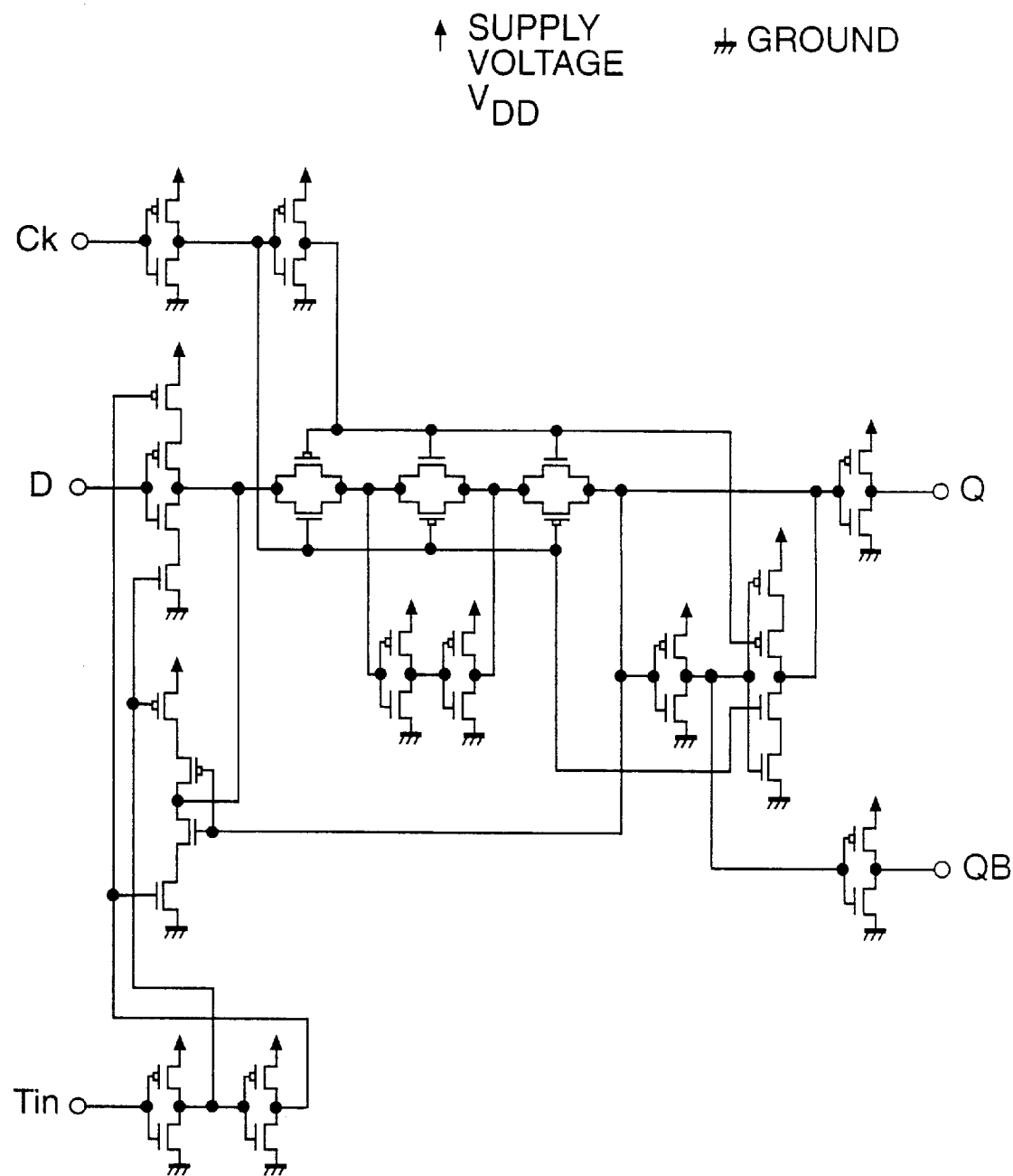
FIG. 4 is a circuit diagram showing an example flip-flop circuit used in the circuit of FIG. 1.

FIG. 4 shows an example circuit diagram for a flip-flop circuit of FIG. 1, in which a normal master-slave flip-flop becomes a triggered flip-flop, based upon this invention. Data input port D becomes an input port of the slave flip-flop at the normal operation. When the control signal (Tin) becomes high, this flip-flop circuit switches to input the signal fed-back from an inverted signal of output port Q of a master flip-flop. When the control signal (Tin) is high, the above flip-flop is used as the triggered flip-flop, because the flip-flop outputs the signal of high and low levels repetitively for an input clock signal.

Figure 5:
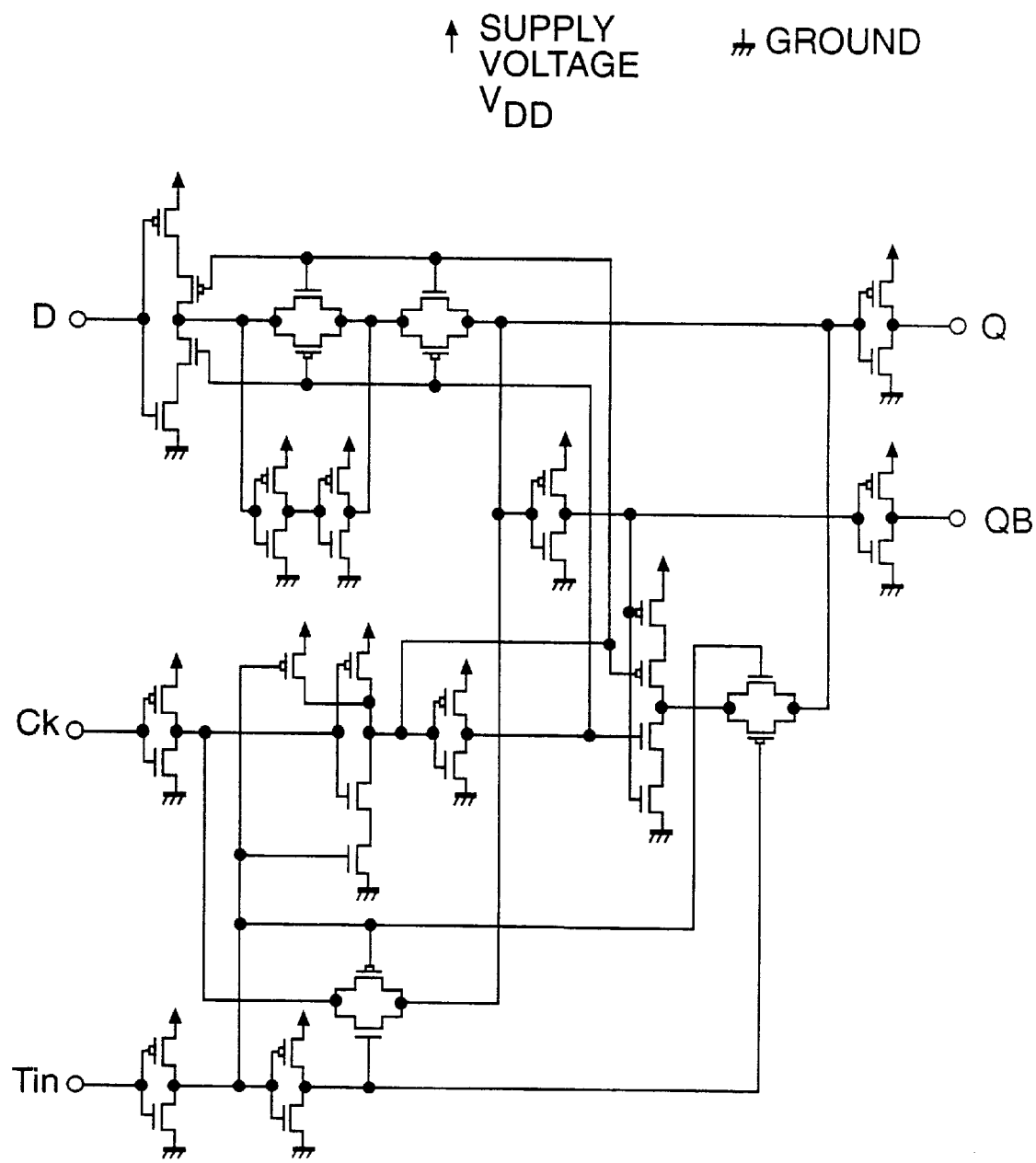
FIG. 5 is a circuit diagram showing an example flip-flop circuit used in the circuit of FIG. 1.

FIG. 5 shows an example circuit diagram for a flip-flop circuit of FIG. 1, in which the normal master-slave flip-flop becomes a buffer circuit that holds and outputs a clock signal. This circuit operates as a master-slave flip-flop circuit during normal operation. When the control signal (Tin) becomes high, the clock signal applied to the flip-flop circuit portion is stopped and the same clock signal is connected directly to the output portion of the flip-flop circuit. The clock signal is output to the output portion of the above flip-flop and the flip-flop circuit outputs the signal of high and low levels repetitively, when the control signal (Tin) is high. Further, a frequency at which the flip-flop circuit outputs the signal of level high and low repetitively becomes twice the frequency at the normal operation because the frequency of the clock signal is twice the frequency of the normal operation. Accordingly, the rate of operation (i.e., the power consumption) can be set to twice the maximum value at the normal operation.

Figure 6:
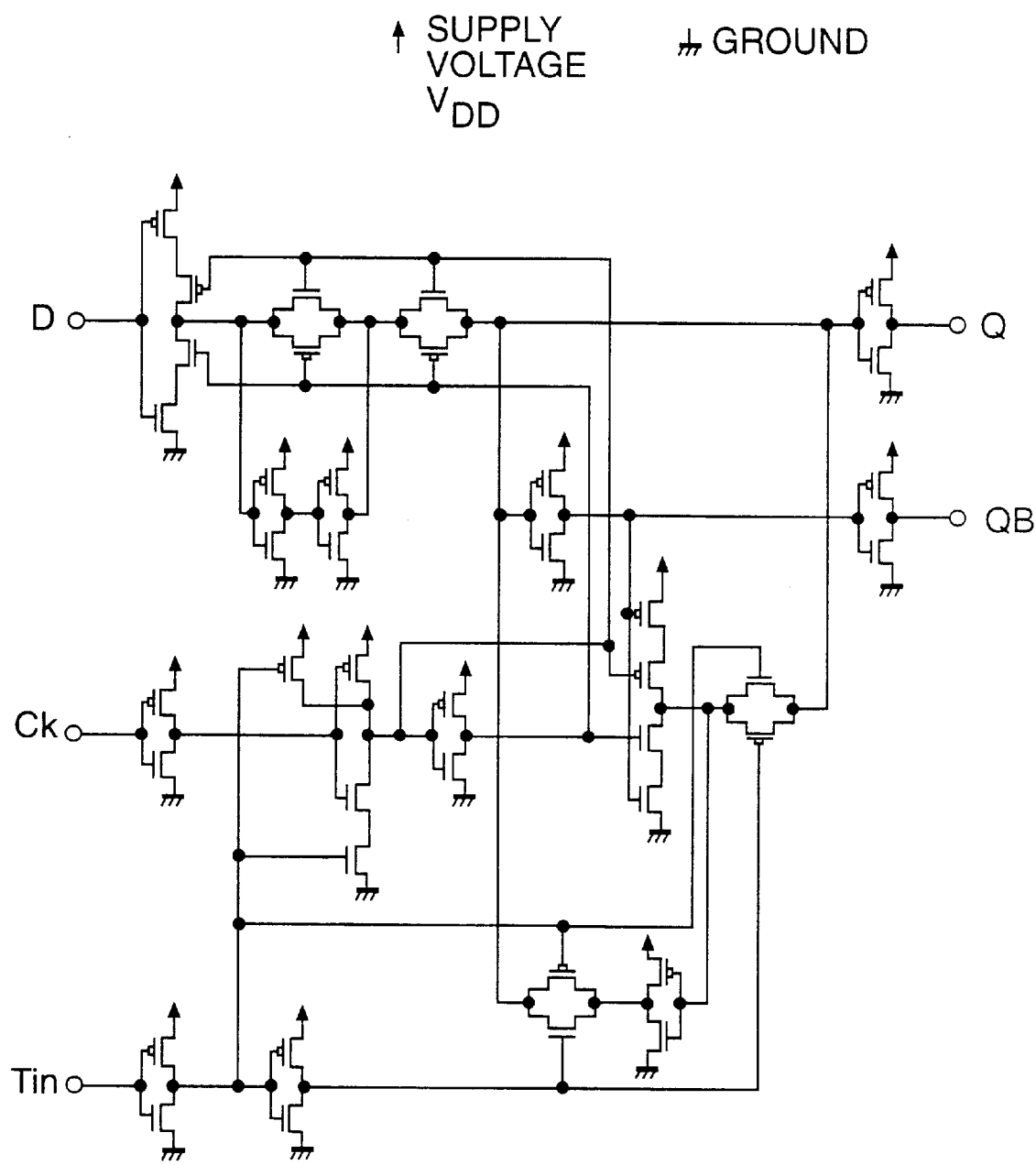
FIG. 6 is a circuit diagram showing an example flip-flop circuit used in the circuit of FIG. 1.

FIG. 6 shows an example circuit diagram for a flip-flop circuit of FIG. 1, in which the normal master-slave flip-flop becomes a pulse generation circuit. This circuit operates as the master-slave flip-flop circuit during normal operation. When the control signal (Tin) becomes high, the clock signal applied to the flip-flop circuit portion is stopped and the master flip-flop part becomes a ring oscillator. The signal from the ring oscillator is output and the flip-flop circuit outputs the signal of high and low levels repetitively, when the control signal (Tin) is high. The rate of operation (i.e., the power consumption) can be determined to an arbitrary value by setting the frequency because the frequency at which the above flip-flop circuit outputs the signal of high and low levels repetitively is twice the frequency of the ring oscillator.

Figure 7:
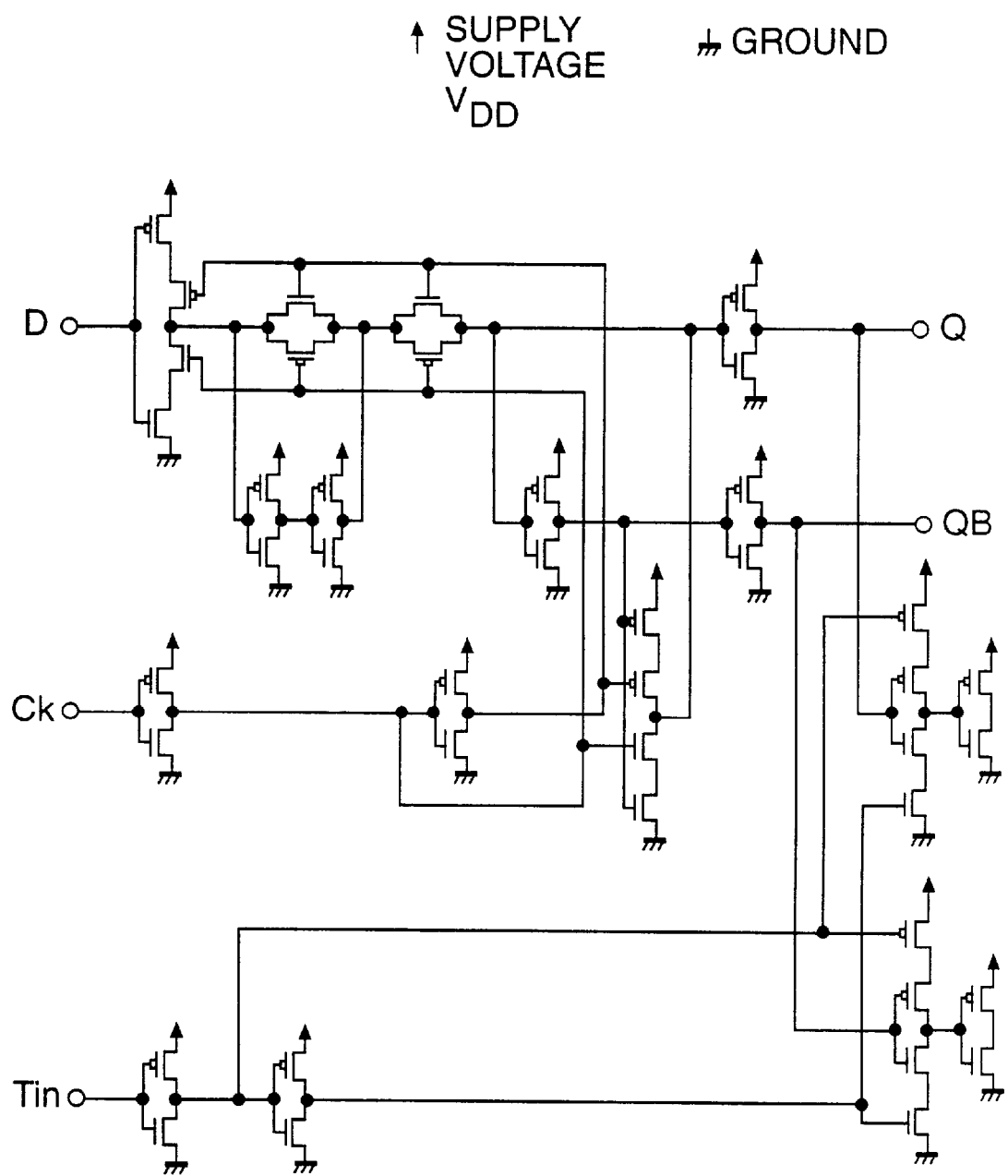
FIG. 7 is a circuit diagram showing an example flip-flop circuit used in the circuit of FIG. 1.

FIG. 7 shows an example circuit diagram for a flip-flop circuit of FIG. 1, in which the flip-flop circuit connects to an added dummy circuit group by applying the control signal (Tin). In addition to the combined circuit group operating after the receipt of the output signal from the flip-flop circuit at the normal operation, when the control signal (Tin) becomes high, this flip-flop circuit operates as soon as the combined circuit does after the receipt of the output signal from the flip-flop circuit by connecting electrically the output of the flip-flop circuit to the dummy circuit group. The dummy circuit, with Tin high, outputs the continuously repeating high and low signal, but performs no logic operation. Since when the control signal (Tin) is high, the number of circuits outputting signals of high and low levels increases more than the number of circuits outputting signals during normal operation, (increased by the number of added dummy circuits) the rate of operation (i.e., the power consumption) can be determined to an arbitrary value.

Figure 8:
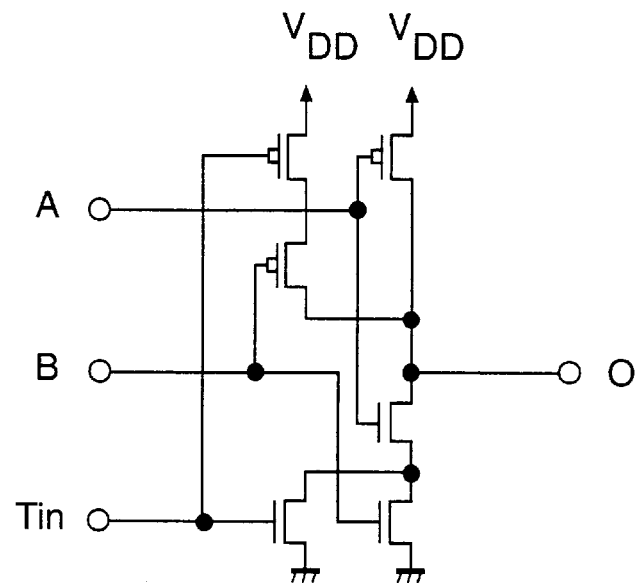
FIG. 8 is an example circuit diagram for the logic gate circuit 109 used in the circuit of FIG. 1.

FIG. 8 shows an example circuit diagram for the logic gate circuit 109 of FIG. 1 based upon this invention, in which the normal logic gate circuit becomes an inverter circuit that inverts an input signal. This logic gate operates as a NAND gate circuit having two inputs A and B during normal operation. When the control signal (Tin) becomes high, the input signal for the input B is stopped and the logic gate becomes an inverter circuit inverting the input signal for the input A. The above logic gate can be used in this invention because the logic gate circuit outputs the signal of high and low levels repetitively corresponding to the repetitive input signal of high and low levels for the input A, when the control signal (Tin) is high. Although the logic gate circuit using two inputs NAND gate is introduced in this examples, a NOR gate and/or a multi-input(more than three inputs) logic gate can also be introduced.

If the combined circuit group includes the logic gate using the principle of a dynamic circuit, the embodiment of this invention would be different. In the case of using the dynamic circuit, once the output signal is set high in response to precharge of an electron during the period of the precharge and when the calculation result for an input signal is low during the period of the logical evaluation, the dynamic circuit discharges the electron and the output signal becomes low. However, when the calculation result for the input signal is high during that period, the dynamic circuit does not discharge the electron and the output signal is high. In short, when the output signal is always low during the period of the logical evaluation, the dynamic circuit always repeats charge-discharge for the electron during the precharged period and the power consumption of the dynamic circuit rises up to a maximum value.

Thus, if the dynamic circuit is applied to this invention, the logic gate circuit can be configured to always keep its output signal low when applying the control signal (Tin).

Figure 9:
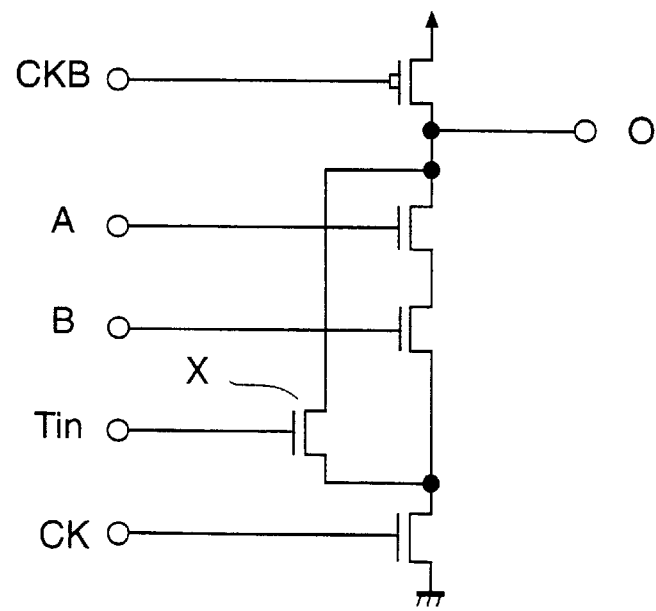
FIG. 9 is an example circuit diagram for the logic gate circuit 109 used in the circuit of FIG. 1.

FIG. 9 shows an example circuit diagram for the logic gate circuit 109 of FIG. 1 based upon this invention, in which the normal logic gate circuit having a dynamic circuit becomes a circuit which always outputs the signal of low level during the period of the logical evaluation. CKB is an input signal that is an inversion of the clock (Ck). This logic gate operates as a NAND gate having two inputs A and B at the normal operation as well as the circuit in FIG. 8. When the control signal (Tin) becomes high, the circuit always outputs the signal of low level during the period of the logical evaluation by conducting an FET X. The logic gate having a dynamic circuit can be used in this invention because when the control signal (Tin) is high, the output signal becomes high by the precharge of the electron, the charged electron is discharged during the period of the logical evaluation and the output signal becomes low, and the logic gate repeats that precharge-discharge. Although the logic gate circuit using a two input NAND gate is introduced, a NOR gate and/or a multi-input (more than three inputs) dynamic logic gate can also be introduced.

Moreover, when calculating the power consumption by using the logical simulation program for designing the semiconductor logic circuit, it is possible to easily calculate the power consumption by applying the example circuits of this invention.

Figure 10:
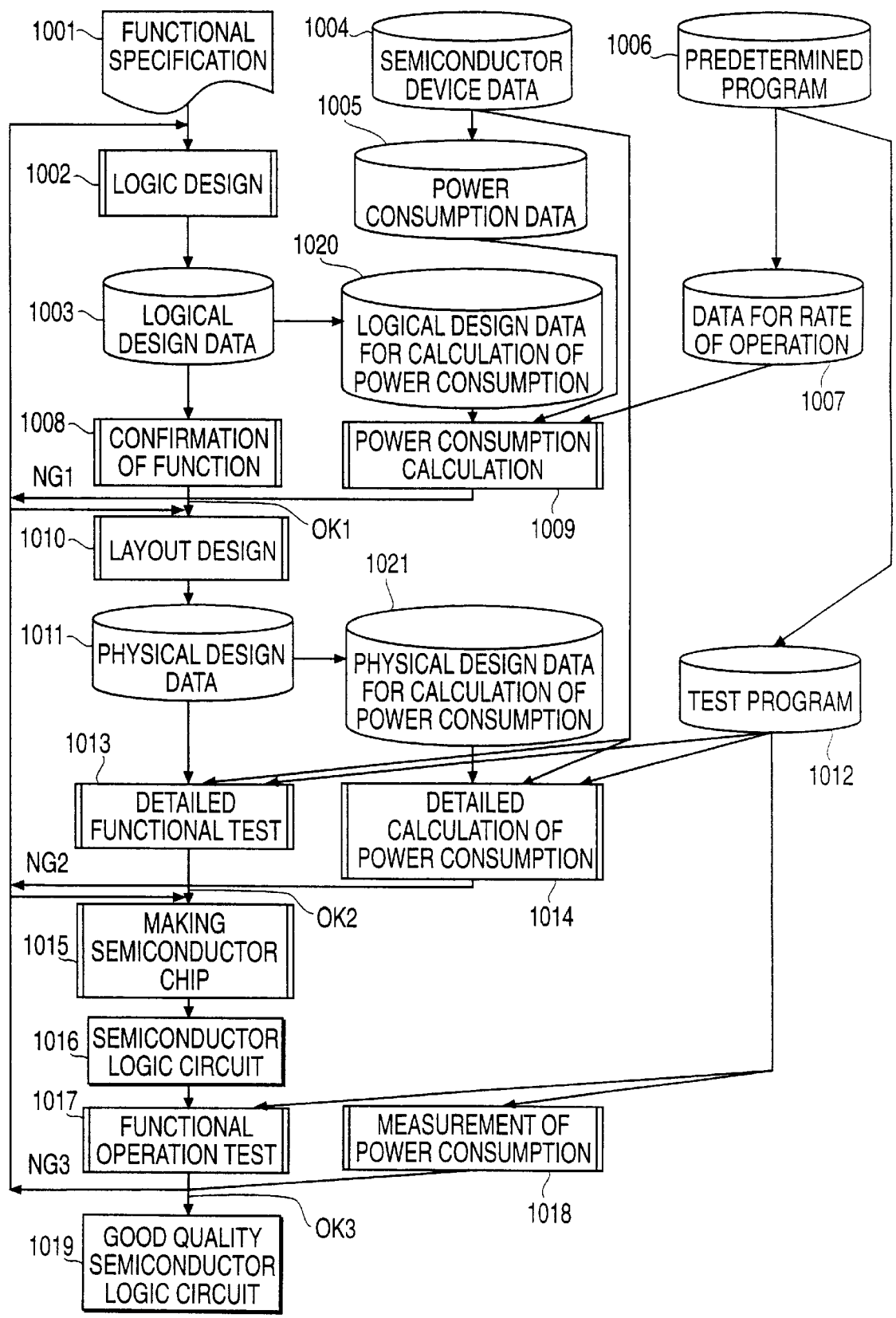
FIG. 10 is a flow chart showing the process of calculating the power consumption for a semiconductor logic circuit by using the simulation program based upon this invention.
Figure 11:
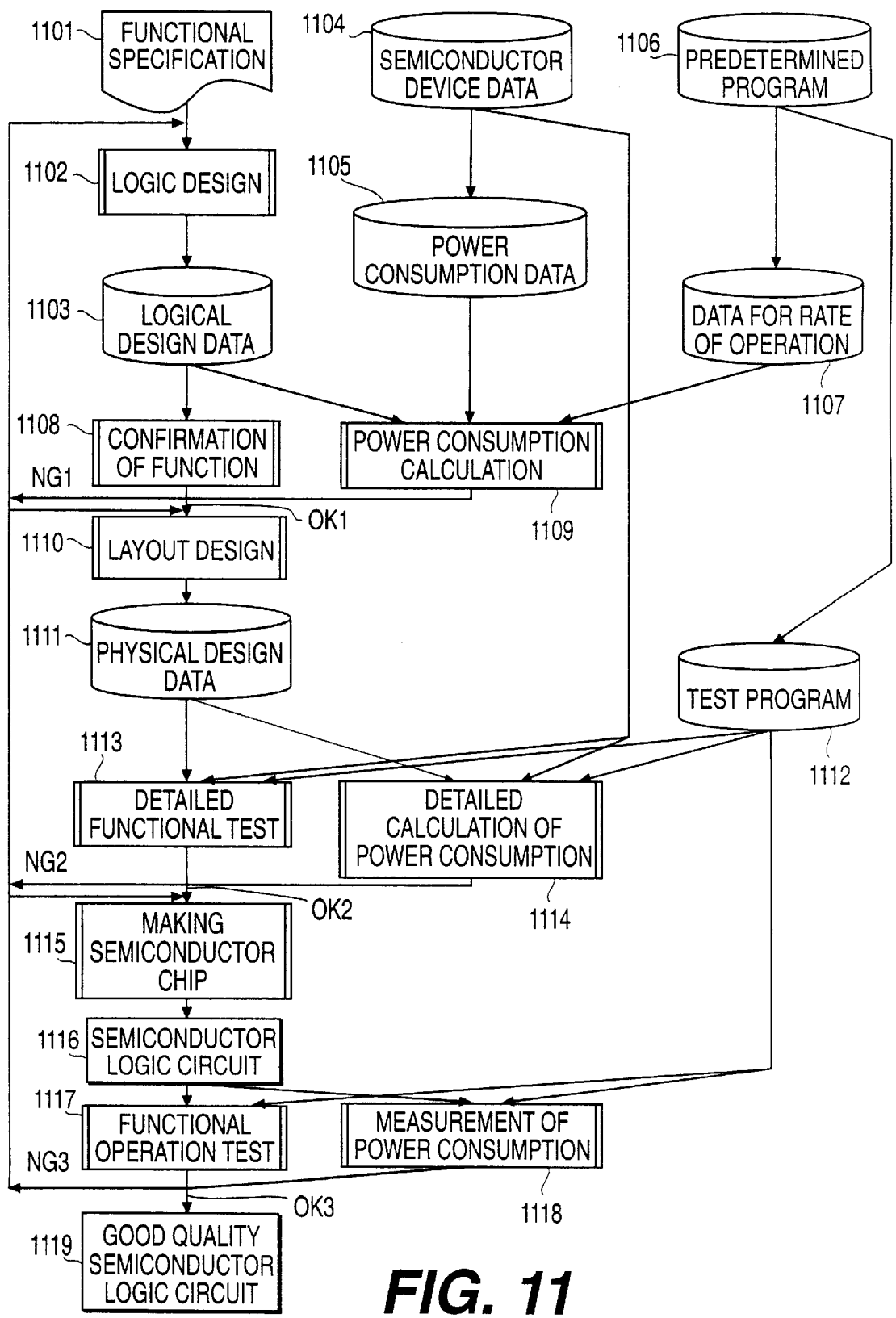
FIG. 11 is a flow chart showing the process of calculating the power consumption for a semiconductor logic circuit using a prior method.

FIG. 10 shows a flow chart applying the examples of circuits as in FIGS. 4 through 9 based upon this invention for designing and producing the semiconductor logic circuit. When calculating the power consumption, the logical design data 1020 as shown in the circuit diagram of FIG. 1 and/or the physical design data 1021 including example circuits of FIGS. 4 through 9 are used in replacing the flip-flop circuit and the logic gate circuit of either the logical design data 1003 or the physical design data 1011 to obtain the circuit used for the calculation of the power consumption and being capable of setting an arbitrary rate of the operation. The power consumption calculation 1009 and/or the detailed calculation of the power consumption 1014 are executed based upon each data 1020 and 1021.

For the circuit used for the power consumption calculation, for example, the flip-flop circuit may be replaced by producing a circuit which outputs the repetitive signal of high and low levels for a desired time during the constant period. Or the logic gate circuit may be replaced by producing another circuit which has the output signal switched high or low according to either one of two input signals applied without the logical calculation.

By employing the above replaced circuits used for the power consumption calculation, it is possible to set the rate of operation for the designed semiconductor to a desired value and to predict accurately the power consumption because the sudden change of the rate of operation can be set arbitrarily. Therefore, it is easy not only to design the semiconductor logic circuit, but also to design the power supply circuit used for the package mounting the semiconductor logic circuit, the wired circuit board and the power supply. Further, the data 1020 and 1021 used for the calculation of the power consumption as in FIG. 10 will not affect the production process of the semiconductor circuit chip because both the original data 1003 and 1011 are not replaced when used for producing the semiconductor logic circuit.

According to a principle of this invention, the power consumption of the whole semiconductor logic circuit is arbitrarily calculated by dividing the corresponding whole semiconductor logic circuit into a plurality of circuit blocks, by replacing the divided logic circuit with the circuit used for the power consumption calculation for a block and thereby setting the rate of operation for the block to a desired value. For example, the rate of operation for the whole semiconductor logic circuit can be set arbitrarily for approximately 10% pitch between 0 and 100% of maximum, and the power consumption for that rate of operation can be estimated by dividing the whole semiconductor logic circuit into 10 blocks, each block having the same number of circuits and by replacing the individual block with the circuit used for the power consumption calculation.

The following are descriptions of the concrete example for the circuit to calculate the power consumption of this invention being capable of setting an arbitrary rate of the operation by replacing the flip-flop circuit. For example, if the flip-flop circuit is replaced with the triggered flip-flop circuit as in FIG. 4, the rate of operation for the replaced flip-flop part and the logic gate circuit connected to the output of that flip-flop part can be set to 100% because the logic gate circuit outputs the signal of high and low levels repetitively for the input clock signal.

If the flip-flop circuit is replaced with the buffer circuit outputting the clock signal as in FIG. 5, the buffer circuit outputs the signal of high and low levels repetitively in response to the clock signal applied. The rate of operation for the replaced flip-flop part and the logic gate circuit connected to that output can be set to 200% because the frequency of the clock signal is twice the maximum frequency of the normal logic signal.

If the flip-flop circuit is replaced with the pulse generation circuit having a desired oscillation frequency as in FIG. 6, such pulse generation circuit outputs the signal of high and low levels repetitively in response to that oscillation frequency, and the rate of operation for the replaced flip-flop part and the logic gate circuit connected to that output can be set to an arbitrary value.

If the dummy circuit group is added to the output of the flip-flop circuit as in FIG. 7, such combination circuit outputs the signal of high and low levels repetitively in response to the output signal of the flip-flop part and can provide an effectiveness being equivalent to the increase of the rate of operation for the logic gate circuit connected to the output of the flip-flop circuit.

The following are descriptions of another concrete example of the circuit used for calculating the power consumption of this invention being capable of setting an arbitrary rate of operation, by replacing the logic gate circuit. For example, if the logic gate circuit having more than two inputs is replaced with an inverter which inverts either one of them as in FIG. 8, the rate of operation for the inverter can be set to 100% because the output of the inverter repeats the signal of high and low levels in response to the repetitive input signal of high and low levels.

Moreover, in the case of the logic gate circuit including the dynamic circuit, if the logic gate circuit is replaced with the circuit which always keeps its output low during the period of logical evaluation as in FIG. 9, the rate of operation for that circuit can be set to 100% because the electron precharged during the period of the precharge is always discharged during the period of the logical evaluation, the dynamic circuit repeats charge-discharge during the precharged period and the power consumption of that circuit rises up to a maximum value.

Through the introduction of above example circuits based upon this invention, the semiconductor logic circuit having the least operational failure can be achieved because it is possible to calculate and determine the power consumption by setting the variation for the rate of operation (i.e., the variation of the power consumption) when estimating the power consumption for designing the semiconductor logic circuit and testing the power consumption of the prototype chip.

Furthermore, as stated above, the present invention is directed to a method of manufacturing a semiconductor logic device having a flip-flop circuit group and a combined circuit group, etc. Also, configuration and rate of operation of the semiconductor logic device are set by applying a control signal executing an operation test of the semiconductor logic circuit to at least one of the flip-flop circuits and logic gate circuits in order to determine power consumption. Based upon this power consumption that is obtained, the semiconductor logic device can be constructed with power lines, power supply and other power handling. Additionally, in order to set the configuration and rate of operation, the design data of circuits can be replaced during logic simulation of the device with tests data that corresponds to circuits that will output a repetitive signal of high and low levels in response to a control signal. The semiconductor logic device is then constructed in accordance with the design data unmodified by the above-mentioned replacing of the design data.

While the present invention has been described above in conjunction with the preferred embodiments, one of ordinary skill in the art would be enabled by this description to make various modifications to these embodiments and still be within the scope and spirit of the present invention as recited in the appended claims.

What is claimed is:

1. A power consumption control circuit for a semiconductor logic device comprising:
   a plurality of flip-flop circuits for processing logical information;
   a plurality of logic gate circuits executing logical calculation and being connected to said flip-flop circuits; and
   a dummy circuit connected between said flip-flop circuits and said logic gate circuits to output a repetitive signal of high and low levels;
   wherein configuration and rate of operation of said semiconductor logic device are set by applying a control signal executing an operation test of said semiconductor logic circuit to at least one of said flip-flop circuits and said logic gate circuits; and
   wherein power consumption is determined when operating said semiconductor circuit according to said configuration and said rate of operation.

2. A semiconductor logic device comprising:
   flip-flop circuit groups having a plurality of flip-flop circuits having logical information;
   at least one combined circuit group having a plurality of logic gate circuits for processing logical calculations and being connected between said flip-flop circuit groups;
   a clock circuit supplying a clock signal to said flip-flop circuit groups; and
   an input terminal at an input side of said flip-flop circuits and said logic gate circuits to which a control signal is applied in order to execute an operation test of said circuits by setting a configuration and a rate of operation for said circuits in order to determine power consumption of said device.

3. An operation test method for a semiconductor logic device comprising a flip-flop circuit group comprising a plurality of flip-flop circuits for processing logical information, a combined circuit group comprising a plurality of logic gate circuits executing logical calculation connected to said flip-flop circuit group, and a clock circuit supplying a clock signal to said flip-flop circuit group, the method comprising the steps of:
   manufacturing a device sample of said semiconductor logic device which includes a test terminal for applying a control signal and configuration change circuit means for setting a rate of operation of said device sample to a desired rate of operation by changing configuration of at least one of said flip-flop circuits and said logic gate circuits into a test mode configuration during the term when said control signal is applied to said test terminal;
   operating said sample device under the desired rate of operation by applying said control signal to said test terminal; and
   determining power consumption of said sample device according to said desired rate of operation.

4. The operation test method according to claim 3, wherein said configuration change circuit means changes said one of said flip-flop circuits into a triggered flip-flop circuit inverting an output signal in synchronism with said clock signal during the term when said control signal is applied to said test terminal.

5. The operation test method according to claim 3, wherein said configuration change circuit means changes said one of said flip-flop circuits into a buffer holding and outputting said clock signal as a logical output during the term when said control signal is applied to said test terminal.

6. The power consumption control method according to claim 3, wherein said setting changes said flip-flop circuit group to an inverter circuit inverting an output signal in response to said control signal.

7. The power consumption control method according to claim 3, wherein said setting changes said flip-flop circuit group to a pulse generation circuit group outputting a repetitive signal of high and low levels in response to said control signal.

8. The operation test method according to claim 3, wherein said configuration change circuit means changes said one of said logic gate circuits which has a plurality of inputs into an inverter outputting a signal that is an inverting signal of one of said inputs during the term when said control signal is applied to said test terminal.

9. The operation test method according to claim 3, wherein said configuration change circuit means changes said one of said logic gate circuits which operates based upon principle of dynamic circuit into a dynamic circuit discharging output in every evaluation period during the term when said control signal is applied to said test terminal.

10. The operation test method according to claim 3, wherein said configuration change circuit means additionally connects a dummy circuit group to an output of said one of said flip-flop circuits during the term when said control signal is applied to said test terminal.

* * * * *